United States Patent [19]

Protheroe et al.

[11] Patent Number: 5,245,139

[45] Date of Patent: Sep. 14, 1993

[54] APPARATUS AND METHOD FOR DIGITIZER SAMPLED POINT VALIDATION

[75] Inventors: Robert L. Protheroe, Lawrenceville, Ga.; Wayne A. Martin, Cumberland; Joseph E. Brehm, Cambridge, both of Ohio

[73] Assignee: NCR Corporation, Dayton, Ohio

[21] Appl. No.: 836,663

[22] Filed: Feb. 18, 1992

[51] Int. Cl.$^5$ ............................................. G08C 21/00
[52] U.S. Cl. ......................................... 178/18; 178/20
[58] Field of Search ............................. 178/18, 19, 20

[56] References Cited

U.S. PATENT DOCUMENTS

| | | | |
|---|---|---|---|
| 4,575,580 | 3/1986 | Jandrell | 178/18 |
| 4,680,429 | 7/1987 | Murdock et al. | 178/19 |
| 4,819,194 | 4/1989 | Koizumi et al. | 364/556 |
| 4,897,511 | 1/1990 | Itaya et al. | 178/18 |
| 5,008,497 | 4/1991 | Asher | 178/18 |

*Primary Examiner*—Stafford Schreyer
*Attorney, Agent, or Firm*—Paul W. Martin

[57] ABSTRACT

An apparatus and method for digitizer sampled point validation which determines the contact resistance at a point of contact between the upper and lower layers of the digitizer and compares the contact resistance with a valid range of contact resistances to either accept or reject the sampled point. The apparatus includes an analog drive circuit for driving the digitizer with one of a plurality of drive sources, a switch control logic coupled to the drive circuit for determining which drive source is coupled to the digitizer, an analog-to-digital convertor coupled to the digitizer, and a microcontroller coupled between the analog-to-digital convertor and the switch control logic. The method of the present invention determines the contact resistance, compares the contact resistance with the valid range, and determines and stores the location of the point if the contact resistance is within the valid range.

50 Claims, 5 Drawing Sheets

APPARATUS AND METHOD FOR DIGITIZER SAMPLED POINT VALIDATION

BACKGROUND OF THE INVENTION

The present invention relates to handwriting capture devices and more specifically to an apparatus and method for digitizer sampled point validation.

Pressure sensitive digitizers are devices used to record the position of a data input instrument, such as a pen or stylus, which is pressing on the surface of the digitizer. The digitizer includes two resistive layers which are normally separated, but which come in contact with each other when subjected to pressure from a data input instrument. Separator dots between the layers prevent contact between the layers except at the point of pressure.

Contact resistance between the resistive layers may create significant inaccuracies in point digitization. Contact resistance increases the charge time of any low pass filters coupled to the digitizer. Low pass filters are commonly used to provide protection against electrostatic discharge, noise immunity, and a stable input to an analog to digital converter which takes the position sample. If charge time is longer than the sample period of the digitizer, then the sample is invalid. This type of inaccurate sample point is herein known as a "spike" and the process which produces the inaccurate point is called "spiking".

Another difficulty encountered when using a pressure sensitive digitizer is the possibility that a plurality of points might be pressed at the same time. One of the points is the actual position of the data input instrument. The other points may correspond to the location of a user's hand on the digitizer or a defect in the digitizer.

Therefore, it would be desirable to provide an apparatus and method for preventing invalid sample points from being recorded.

SUMMARY OF THE INVENTION

In accordance with the teachings of the present invention, an apparatus and method for digitizer sampled point validation is provided. The apparatus includes an analog drive circuit for driving the digitizer with one of a plurality of drive sources, a switch control logic coupled to the drive circuit for determining which drive source is coupled to the digitizer, an analog-to-digital convertor coupled to the digitizer, and a microcontroller coupled between the analog-to-digital converter and the switch control logic. The microcontroller controls the switch control logic, determines the contact resistance between the upper and lower resistive layers of the digitizer at a point of contact between the two layers, and compares the contact resistance to a valid range of contact resistances to either accept or reject the point.

The method for determining the validity of a point sampled from a digitizer includes the steps of determining the contact resistance at a point of contact between the upper and lower layers of the digitizer and comparing the contact resistance to a range of valid contact resistances. If the contact resistance is within the valid range, the method further includes determining the location of the point, and storing the location in a memory.

Under the method of the present invention, the contact resistance is determined by the steps of measuring a first voltage across the upper layer; measuring a second voltage across the lower layer; measuring a third voltage across a first portion of the upper layer and a first portion of the lower layer, the first portions being joined by the point of contact; measuring a fourth voltage across a second portion of the upper layer and a second portion of the lower layer, the second portions being joined by the point of contact; and determining the difference between the sum of the first and second voltages and the sum of the third and fourth voltages.

It is accordingly an object of the present invention to provide an apparatus and method for digitizer sampled point validation.

It is another object of the present invention to provide an apparatus and method for digitizer sampled point validation which calculates the contact resistance between digitizer layers and compares it to a valid range of contact resistances to reject or accept position samples.

It is another object of the present invention to provide an apparatus and method for determining contact resistance between digitizer layers.

It is another object of the present invention to provide an apparatus and method for determining the coordinates of a sample point at a point of contact between digitizer layers.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
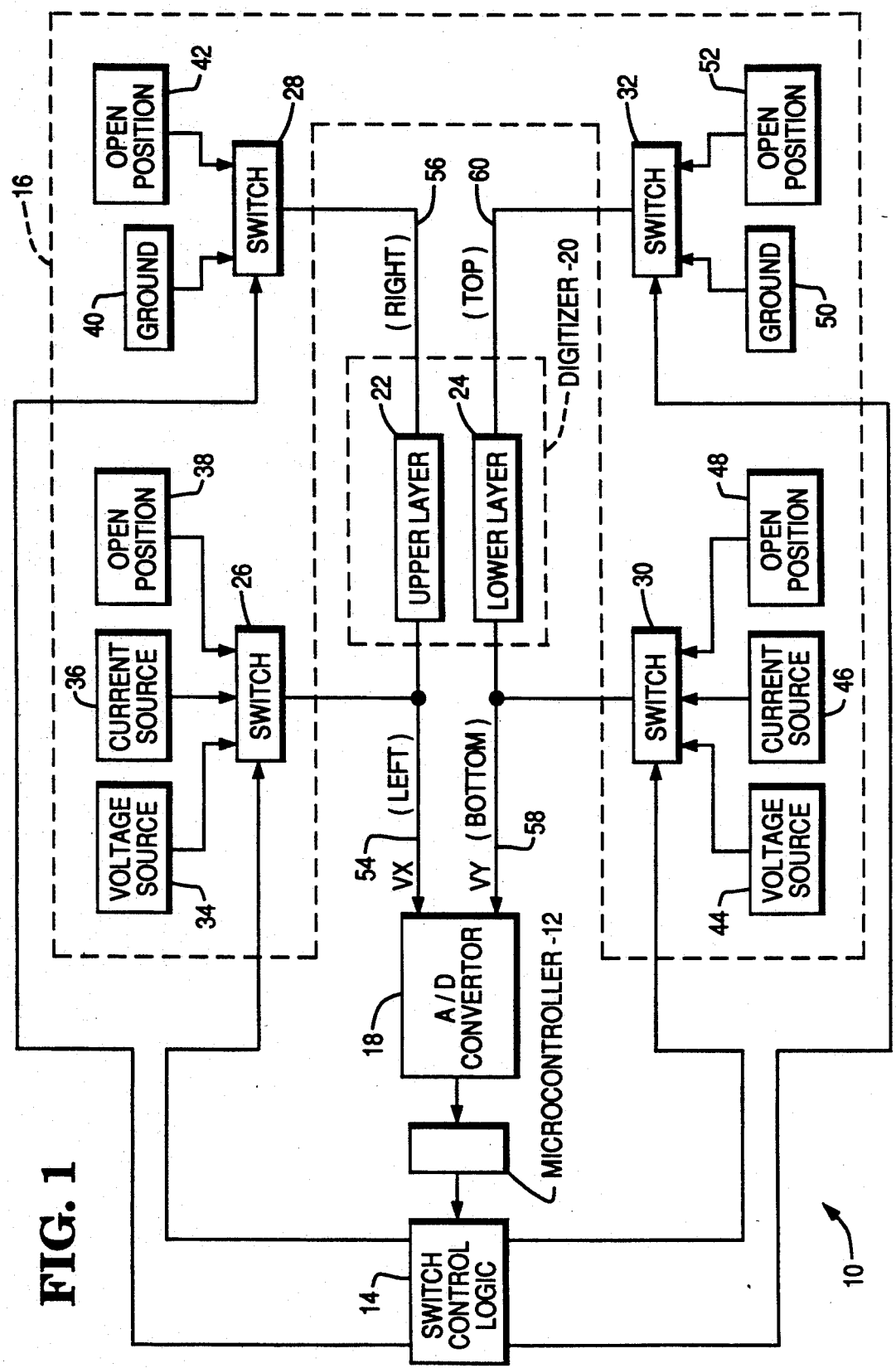
FIG. 1 is a block diagram of the apparatus of the present invention.

Referring now to FIG. 1, apparatus 10 of the present invention primarily includes microcontroller 12, switch control logic 14, analog drive circuit 16, and analog-to-digital (A/D) convertor 18.

Microcontroller 12 controls the operation of apparatus 10. It includes a memory and a data buffer which receive inputs from digitizer 20 through A/D convertor 18. It controls analog drive circuit 16 through switch control logic 14. It calculates contract resistance between upper and lower layers 22 and 24 of digitizer 20, determines the position of points of contact between layers 22 and 24, and determines the validity of position samples.

Switch control logic 14 controls the operation of analog drive circuit 16 in response to commands from microcontroller 12. Preferably, switch control logic 14 includes a latch which receives clock and command inputs from microcontroller 12. The latch may be one which is outside or inside microcontroller 12. If the latch is internally located, the microcontroller package must have enough port pins to implement apparatus 10. A discussion of latch circuits can be found in the book, "Microelectronics", by Jacob Millman, published by McGraw-Hill Book Co. in 1979.

Analog drive circuit 16 includes switches 26–32 and a plurality of digitizer inputs, including voltage sources 34 and 44, current sources 36 and 46, open positions 38 and 48, grounds 40 and 50, and open positions 42 and 52. Switches 26–32 are preferably transistor switching circuits. A discussion of such circuits can be found in the book, "Electronic Circuits and Applications", by Stephen D. Sentura and Bruce D. Wedlock, published by John Wiley & Sons in 1975.

A/D convertor 18 samples voltages Vx and Vy of digitizer 20 and converts them to digital code for use by microcontroller 12. The digital representations of the sampled voltages Vx and Vy are proportional to the actual analog values of voltages Vx and Vy.

Digitizer 20 includes upper and lower layers 22 and 24. Each layer includes two parallel wire electrodes. Upper layer 22 includes left and right parallel electrodes 54 and 56, and lower layer 24 includes bottom and top parallel electrodes 58 and 60. Electrodes 54 and 56 run perpendicular to electrodes 58 and 60.

Figure 2:
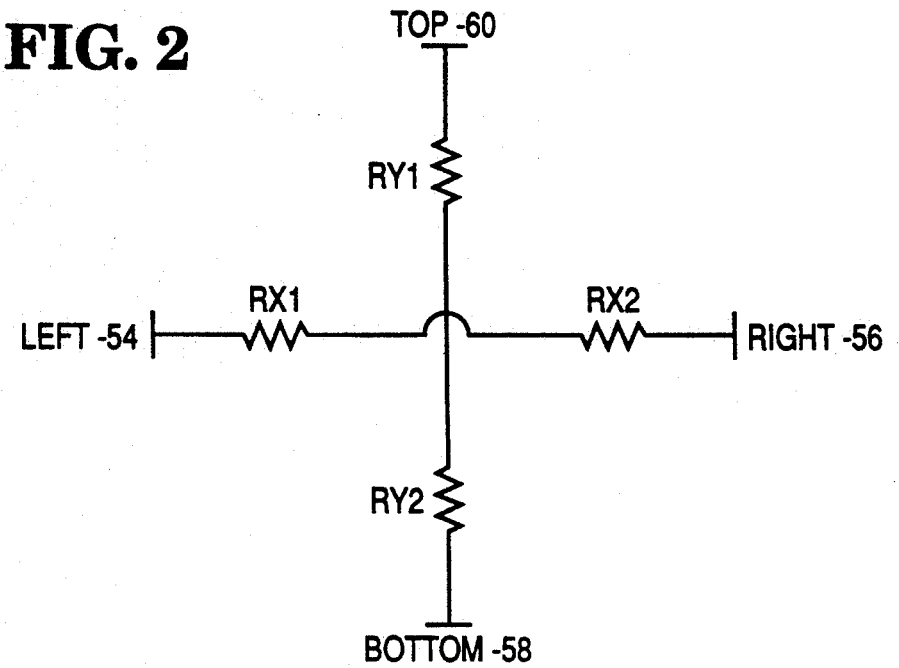
FIG. 2 is a discrete resistor model of a digitizer without applied pressure.

Referring now to FIG. 2, a discrete resistor model of digitizer 20 is shown, without an applied touch from a data input instrument. Layers 22 and 24 each have uniformly distributed resistances. However, under the model, each layer is represented as two resistances. Left and right electrodes 54 and 56 are separated by resistances Rx1 and Rx2, while bottom and top electrodes 58 and 60 are separated by resistances Ry1 and Ry2.

Figure 3:
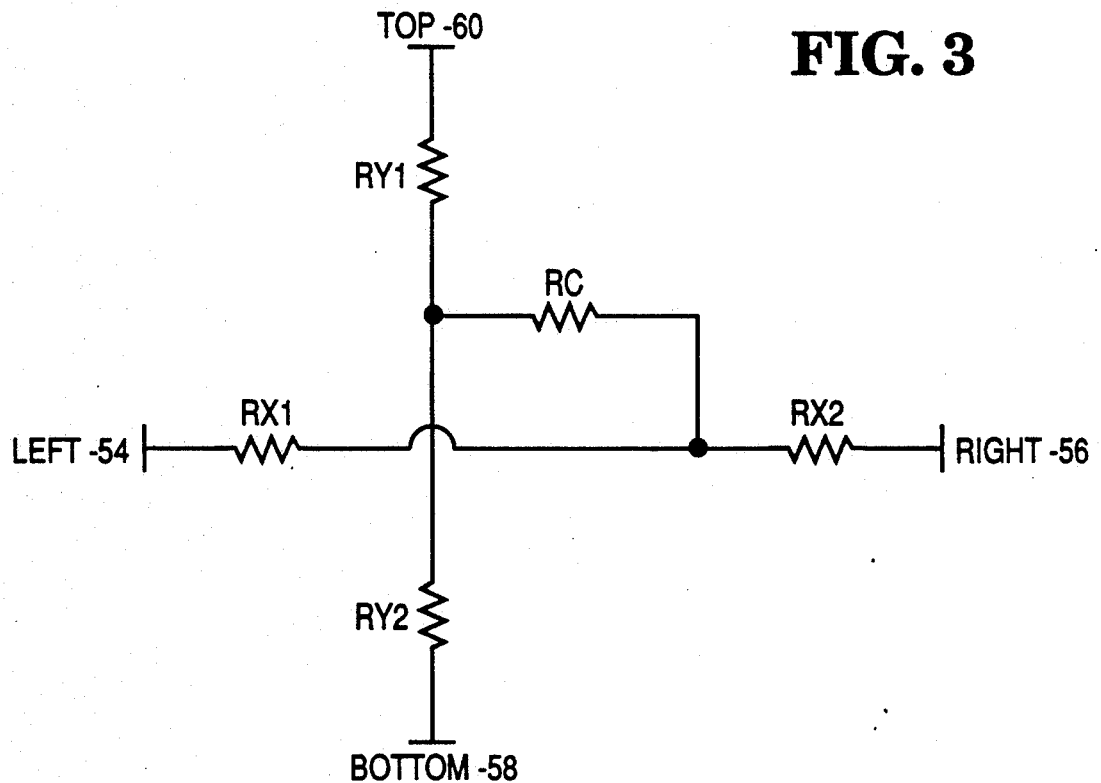
FIG. 3 is the discrete resistor model of FIG. 2, modified to include an applied pressure.

Referring now to FIG. 3, the discrete resistor model of FIG. 2 has been modified to include a touch from a data input instrument. Upper and lower layers 22 and 24 are connected by contact resistance Rc. The point of contact between layers 22 and 24 determines the value of Rx1, Rx2, Ry1, and Ry2.

Figure 4:
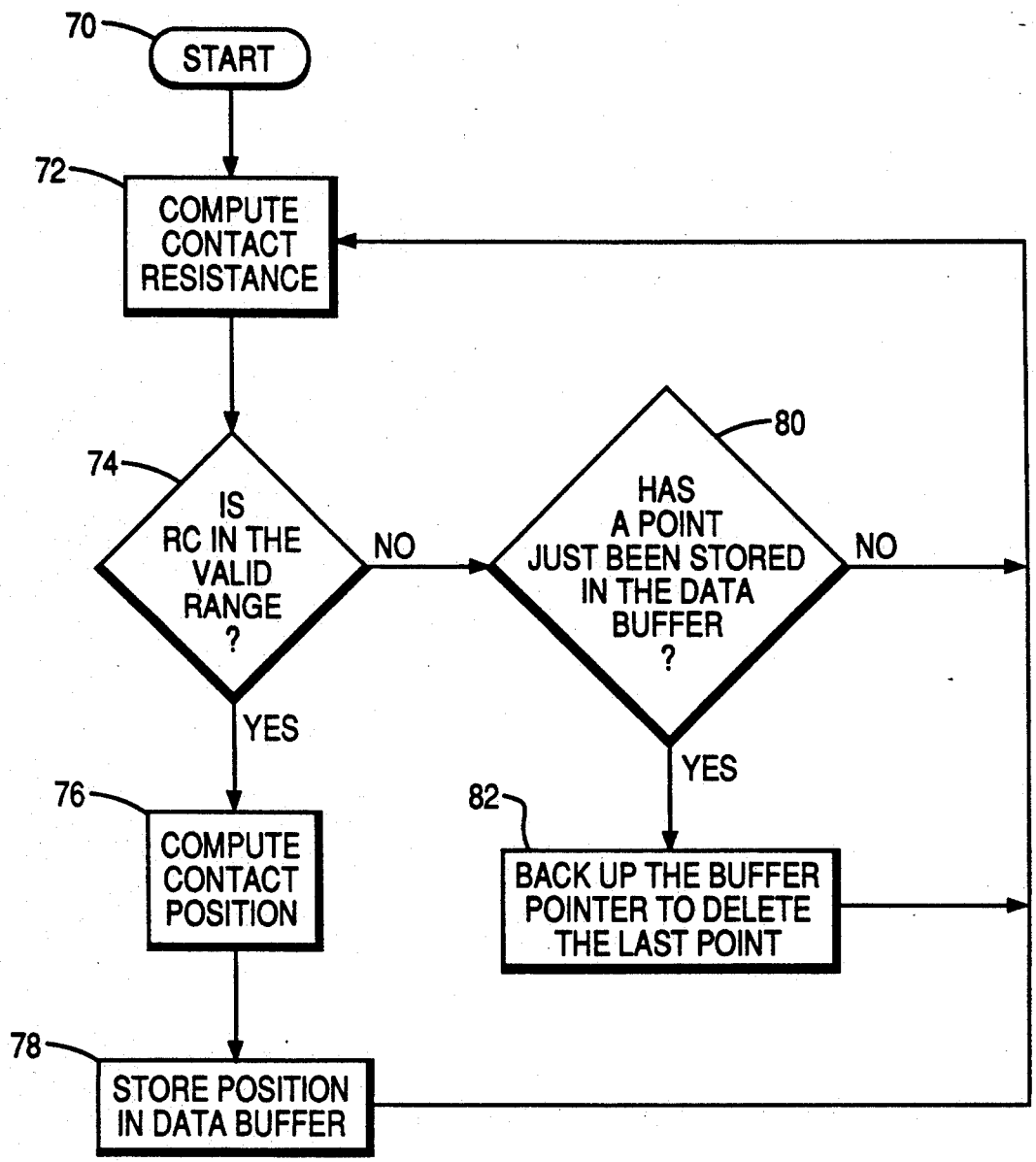
FIG. 4 is a flow diagram of a method for choosing among a plurality of position samples.

Referring now to FIG. 4, a method for choosing among a plurality of position samples is shown, beginning with START 70.

In block 72, contact resistance Rc is computed using apparatus 10. Block 72 is broken down in FIG. 5.

In block 74, microcontroller 12 compares contact resistance Rc with a predetermined valid range.

If contact resistance Rc is within the valid range, then microcontroller 12 computes the position of the contact point in block 76. Block 76 is broken down in FIG. 6.

In block 78, the position sample is then accepted and stored in the data buffer of microcontroller 12 and the method returns to block 72 to compute a new value for contact resistance Rc.

If contact resistance Rc is outside the valid range, then the method determines if a point has just been stored in the data buffer of microcontroller 12 in block 80. If contact resistance Rc is above the valid range, then there is insufficient pressure being applied at the point of contact and spiking has occurred. If contact resistance is below the valid range, then more than one point of contact exists at the same time.

If no point has just been stored, then the method returns to block 72 to compute a new value for contact resistance Rc.

If a point has just been stored, the method proceeds to block 82 to backup the buffer pointer to delete the last point. The method then returns to block 72 to calculate a new value for contact resistance Rc.

Figure 5:
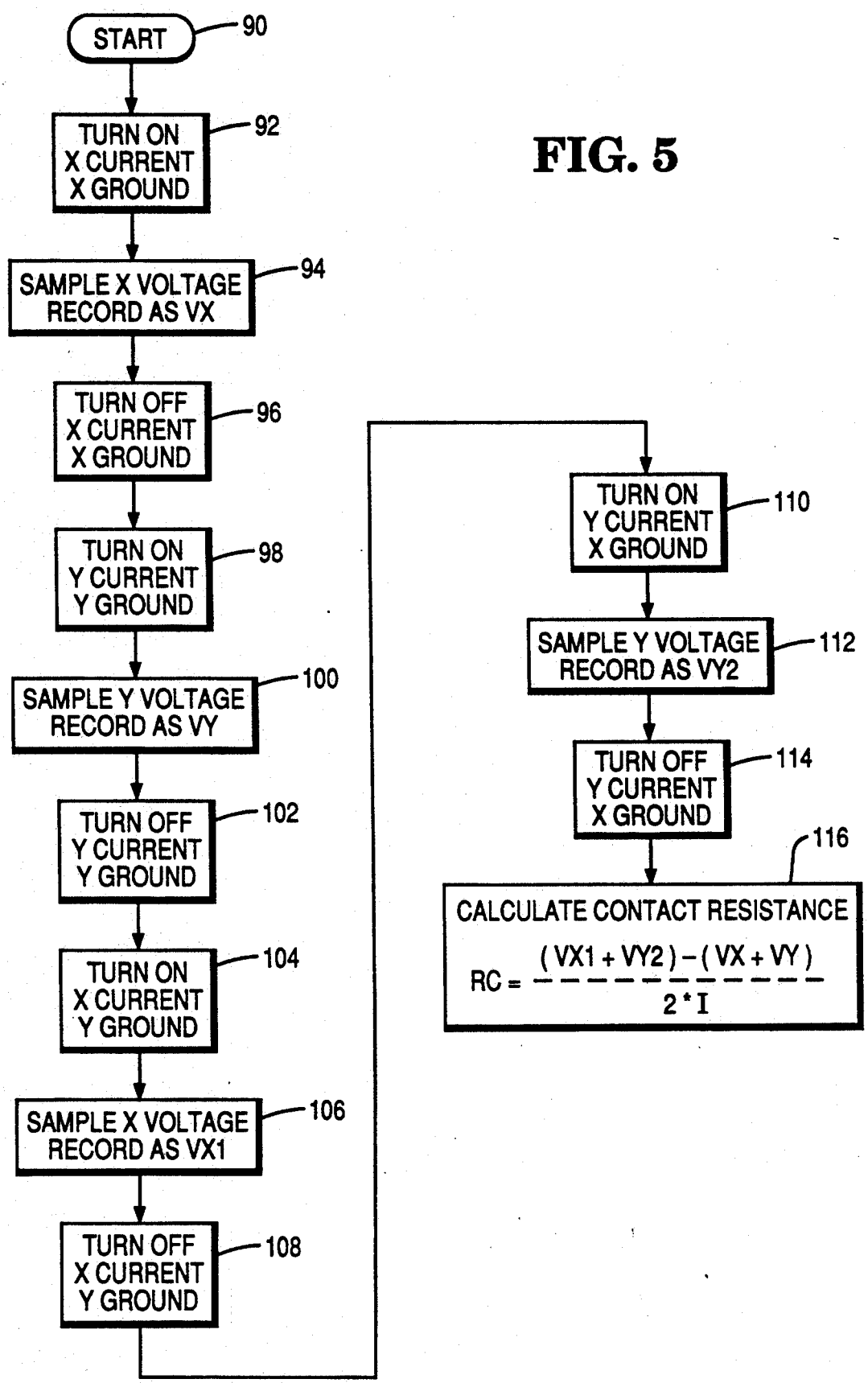
FIG. 5 is a flow diagram of a method for computer contact resistance.

Referring now to FIG. 5, a method for determining contact resistance Rc is shown, beginning with START 90.

In block 92, microcontroller 12 signals switch control logic 14 to cause switch 26 to couple current source 36 to left electrode 54, and to cause switch 28 to couple ground 40 to right electrode 56.

In block 94, A/D convertor 18 samples voltage Vx at electrode 54 and microcontroller 12 records voltage Vx.

In block 96, microcontroller 12 signals switch control logic 14 to cause switch 26 to turn off current source 36, and to cause switch 28 to turn off ground 40.

In block 98, microcontroller 12 signals switch control logic 14 to cause switch 30 to couple current source 46 to bottom electrode 58, and to cause switch 32 to couple ground 50 to top electrode 60.

In block 100, A/D convertor 18 samples voltage Vy at electrode 58 and microcontroller 12 records voltage Vy.

In block 102, microcontroller 12 signals switch control logic 14 to cause switch 30 to turn off current source 46, and to cause switch 32 to turn off ground 50.

In block 104, microcontroller 12 signals switch control logic 14 to cause switch 26 to couple current source 36 to left electrode 54, and to cause switch 32 to couple ground 50 to top electrode 60.

In block 106, A/D convertor 18 samples voltage Vx at electrode 54 and microcontroller 12 records it as voltage Vx1.

In block 108, microcontroller 12 signals switch control logic 14 to cause switch 26 to turn off current source 36, and to cause switch 32 to turn off ground 50.

In block 110, microcontroller 12 signals switch control logic 14 to cause switch 30 to couple current source 46 to bottom electrode 58, and to cause switch 28 to couple ground 40 to right electrode 56.

In block 112, A/D convertor 18 samples voltage Vy at electrode 58 and microcontroller 12 records it as voltage Vy1.

In block 114, microcontroller 12 signals switch control logic 14 to cause switch 30 to turn off current source 46, and to cause switch 28 to turn off ground 40.

In block 116, microcontroller 12 calculates contact resistance Rc based upon the formula:

$$Rc = [(Vx1 + Vy1) - (Vx + Vy)]/2*I$$

where I is constant and equal to the current from both current sources 36 and 46. Since the A/D convertor outputs and the contact resistance Rc are proportional to the actual voltage readings, it is not necessary to convert the A/D convertor outputs to actual voltage readings, nor is it necessary to divide the actual voltage or A/D outputs by the quantity (2*I). One can merely establish a valid range of A/D convertor outputs with which the difference between the sum of the A/D convertor outputs for voltages Vx and Vy and the sum of the A/D convertor outputs for voltages Vx1 and Vy1 are compared.

Figure 6:
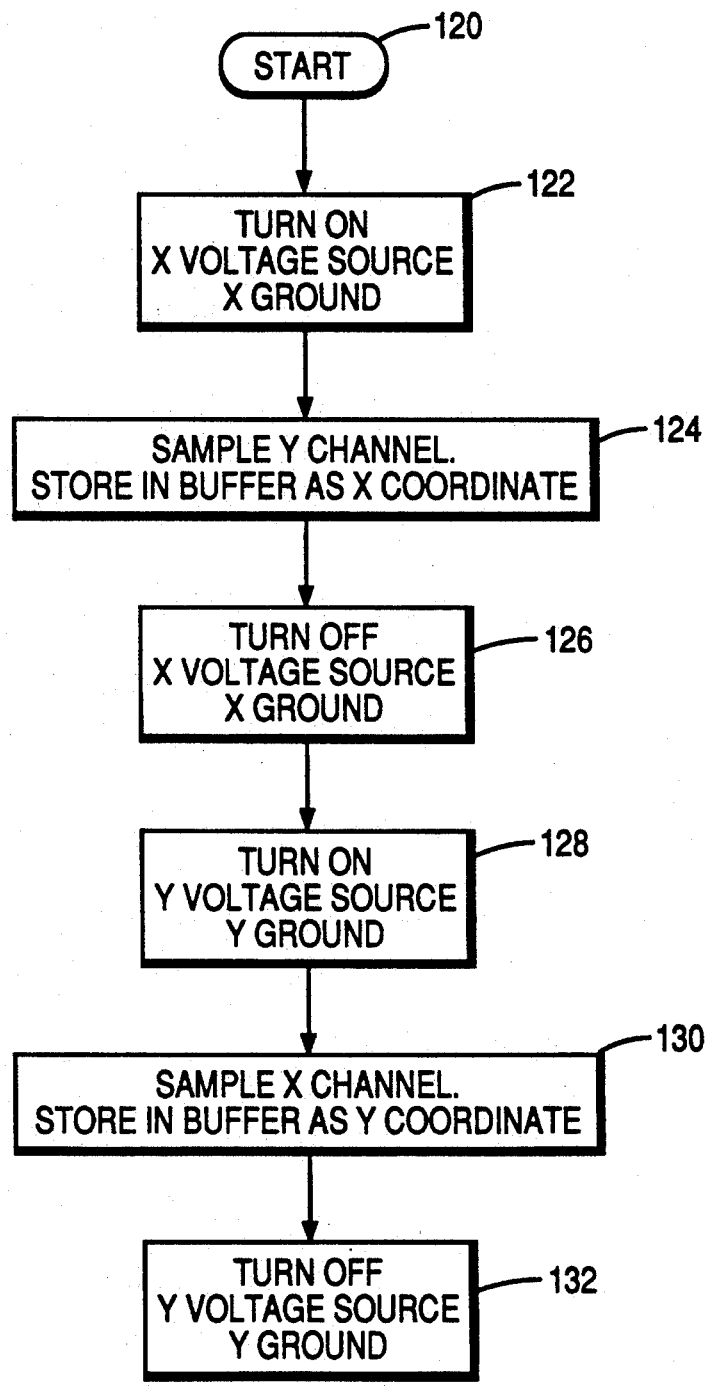
FIG. 6 is a flow diagram of a method for computing the position of a contact point.

Referring now to FIG. 6, a method for determining the position of a contact point on digitizer 20 is shown, beginning with START 120.

In block 122, microcontroller 12 signals switch control logic 14 to cause switch 26 to couple voltage source 34 to left electrode 54, and to cause switch 28 to couple ground 40 to right electrode 56.

In block 124, A/D convertor 18 samples voltage Vy at electrode 58 and the result is stored in the buffer of microcontroller 12 as the X-coordinate of the contact point.

In block 126, microcontroller 12 signals switch control logic 14 to cause switch 26 to turn off voltage source 34, and to cause switch 28 to turn off ground 40.

In block 128, microcontroller 12 signals switch control logic 14 to cause switch 30 to couple voltage source 44 to bottom electrode 58, and to cause switch 32 to couple ground 50 to top electrode 60.

In block 130, A/D convertor 18 samples voltage Vx at electrode 54 and the result is stored in the buffer of microcontroller 12 as the Y-coordinate of the contact point.

In block 132, microcontroller 12 signals switch control logic 14 to cause switch 30 to turn off voltage source 44, and to cause switch 32 to turn off ground 50.

Although the present invention has been described with particular reference to certain preferred embodiments thereof, variations and modifications of the present invention can be effected within the spirit and scope of the following claims.

What is claimed is:

1. An apparatus for determining the validity of a point sampled from a digitizer having upper and lower resistive layers, each layer containing a plurality of electrodes, the apparatus comprising:
    drive means for driving the digitizer with one of a plurality of drive sources;
    selection means coupled to the drive means for determining which drive source is coupled to the digitizer;
    means for sensing a predetermined electrical parameter at a predetermined number of electrodes coupled to the digitizer; and
    control means coupled between the sensing means and the selection means for controlling the selection means, and for determining the contact resistance between the upper and lower resistive layers at at least one point of contact between the two layers and comparing the contact resistance to a valid range of contact resistances to either accept or reject the point;
    wherein a contact resistance below the valid range is indicative of a plurality of points of contact and a resistance above the valid range is indicative of insufficient pressure at the point of contact.

2. The apparatus as recited in claim 1, wherein the drive means comprises:
    a current source coupled to one electrode; and
    a ground for the current source coupled to another electrode.

3. The apparatus as recited in claim 2, wherein the one electrode is in the same layer as the other electrode.

4. The apparatus as recited in claim 2, wherein the one electrode and the other electrode are in different layers.

5. The apparatus as recited in claim 2, wherein the control means also determines the coordinates of the point and the drive means further comprises:
    a voltage source coupled to the one electrode; and
    a ground for the voltage source coupled to another electrode on the same layer as the one electrode.

6. The apparatus as recited in claim 5, wherein the drive means further comprises:
    switching means controlled by the selection means for coupling a single source and a single ground to the digitizer at a time.

7. The apparatus as recited in claim 1, wherein the selection means comprises a latch.

8. The apparatus as recited in claim 1, wherein the sensing means comprises an analog-to-digital convertor.

9. The apparatus as recited in claim 1, wherein the control means comprises a microcontroller.

10. An apparatus for determining the validity of a point sampled from a digitizer having upper and lower resistive layers comprising:
    drive means for driving the digitizer with one of a plurality of drive sources including a current source, a voltage source, a ground, and switching means for coupling the sources and the ground to the digitizer;
    selection means coupled to the drive means for determining which drive source is coupled to the digitizer including a latch;
    an analog-to-digital converter coupled to the digitizer; and
    control means coupled between the analog-to-digital converter and the selection means for controlling the selection means, for determining the contact resistance at at least one point of contact between the upper and lower resistive layers, for determining the coordinates of the point of contact between the upper and lower resistive layers, and for comparing the contact resistance to a valid range of contact resistance to either accept or reject the point;
    wherein a contact resistance below the valid range is indicative of a plurality of points of contact and a resistance above the valid range is indicative of insufficient pressure at the point of contact.

11. A method for determining the validity of a point sampled from a digitizer having upper and lower resistive layers, each containing a plurality of electrodes, the method comprising the steps of:
    (a) determining the contact resistance at at least one point of contact between the upper and lower layers;
    (b) comparing the contact resistance to a range of valid contact resistances;
    (c) if the contact resistance is within the valid range, determining the location of the point and accepting the location; and
    (d) if the contact resistance is above the valid range, which is indicative of a plurality of points of contact, or if the contact resistance is below the valid range, which is indicative of insufficient pressure at the point of contact, rejecting the location.

12. The method as recited in claim 11, wherein step a comprises the substeps of:
    (a-1) measuring a first voltage across the upper layer;
    (a-2) measuring a second voltage across the lower layer;
    (a-3) measuring a third voltage across a first portion of the upper layer and a first portion of the lower layer, the first portions being joined by the point of contact;
    (a-4) measuring a fourth voltage across a second portion of the upper layer and a second portion of the lower layer, the second portions being joined by the point of contact; and (a-5) determining the difference between the sum of the first and second voltages and the sum of the third and fourth voltages.

13. The method as recited in claim 12, wherein the upper layer comprises first and second electrodes and the lower layer comprises third and fourth electrodes, and wherein substep (a-1) comprises the substeps of:
   (a-1-A) coupling a current source to the first electrode;
   (a-1-B) coupling a ground to the second electrode; and
   (a-1-C) sampling the voltage at the first electrode and storing it as the first voltage.

14. The method as recited in claim 12, wherein the upper layer comprises first and second electrodes and the lower layer comprises third and fourth electrodes, and wherein substep (a-2) comprises the substeps of:
   (a-2-A) coupling a current source to the third electrode;
   (a-2-B) coupling a ground to the fourth electrode; and
   (a-2-C) sampling the voltage at the third electrode and storing it as the second voltage.

15. The method as recited in claim 12, wherein the upper layer comprises first and second electrodes and the lower layer comprises third and fourth electrodes, and wherein substep (a-3) comprises the substeps of:
   (a-3-A) coupling a current source to the first electrode;
   (a-3-B) coupling a ground to the fourth electrode; and
   (a-3-C) sampling the voltage at the first electrode and storing it as the third voltage.

16. The method as recited in claim 12, wherein the upper layer comprises first and second electrodes and the lower layer comprises third and fourth electrodes, and wherein substep (a-4) comprises the substeps of:
   (a-4-A) coupling a current source to the third electrode;
   (a-4-B) coupling a ground to the second electrode; and
   (a-4-C) sampling the voltage at the third electrode and storing it as the fourth voltage.

17. The method as recited in claim 13, wherein substeps a-1-A and a-3-A comprise the substep of closing a switch between the current source and the first electrode.

18. The method as recited in claim 13, wherein substeps a-2-A and a-4-A comprise the substep of closing a switch between the current source and the third electrode.

19. The method as recited in claim 13, wherein substeps a-1-A and a-4-A comprise the substep of closing a switch between the ground and the second electrode.

20. The method as recited in claim 13, wherein substeps a-2-A and a-3-A comprise the substep of closing a switch between the ground and the fourth electrode.

21. The method as recited in claim 20, wherein step c comprises the substeps of:
   (c-1) coupling a voltage source to a first electrode on the upper layer;
   (c-2) coupling a ground to a second electrode on the upper layer;
   (c-3) sampling the voltage on a third electrode on the lower layer and accepting it as a first position coordinate;
   (c-4) coupling the voltage source to the third electrode;
   (c-5) coupling the ground to a fourth electrode on the lower layer; and
   (c-6) sampling the voltage on the first electrode and accepting it as a second position coordinate.

22. The method as recited in claim 21, wherein substep c-1 comprises the substep of:
   (c-1-A) closing a first switch between the voltage source and the first electrode.

23. The method as recited in claim 22, wherein substep c-2 comprises the substep of:
   (c-2-A) closing a second switch between the ground and the second electrode.

24. The method as recited in claim 23, wherein substep c-4 comprises the substeps of:
   (c-4-A) opening the first switch; and
   (c-4-B) closing a third switch between the voltage source and the third electrode.

25. The method as recited in claim 24, wherein substep c-5 comprises the substeps of:
   (c-5-A) opening the second switch; and
   (c-5-B) closing a fourth switch between the ground and the fourth electrode.

26. A method for determining the contact resistance at a point of contact between the upper and lower layers of a digitizer comprising the steps of:
   (a) measuring a first voltage across the upper layer;
   (b) measuring a second voltage across the lower layer;
   (c) measuring a third voltage across a first portion of the upper layer and a first portion of the lower layer, the first portions being joined by the point of contact;
   (d) measuring a fourth voltage across a second portion of the upper layer and a second portion of the lower layer, the second portions being joined by the point of contact; and
   (e) determining the difference between the sum of the first and second voltages and the sum of the third and fourth voltages.

27. An apparatus for determining the validity of a point sampled from a digitizer having upper and lower resistive layers, each layer containing a plurality of electrodes, the apparatus comprising:
   drive means for driving the digitizer with one of a plurality of drive sources, including a current source coupled to one electrode, and a ground for the current source coupled to another electrode, wherein the one electrode is in the same layer as the other electrode;
   selection means coupled to the drive means for determining which drive source is coupled to the digitizer;
   means for sensing a predetermined electrical parameter at a predetermined number of electrodes coupled to the digitizer; and
   control means coupled between the sensing means and the selection means for controlling the selection means, and for determining the contact resistance between the upper and lower resistive layers at a point of contact between the two layers and comparing the contact resistance to a valid range of contact resistances to either accept or reject the point.

28. The apparatus as recited in claim 27, wherein the control means also determines the coordinates of the point and the drive means further comprises:
   a voltage source coupled to the one electrode; and
   a ground for the voltage source coupled to another electrode on the same layer as the one electrode.

29. The apparatus as recited in claim 28, wherein the drive means further comprises:
   switching means controlled by the selection means for coupling single source and a single ground to the digitizer at a time.

30. The apparatus as recited in claim 27, wherein the selection means comprises a latch.

31. The apparatus as recited in claim 27, wherein the sensing means comprises an analog-to-digital converter.

32. The apparatus as recited in claim 27, wherein the control means comprises a microcontroller.

33. A method for determining the validity of a point sampled from a digitizer having upper and lower resistive layers, each containing a plurality of electrodes, the method comprising the steps of:
   (a) determining the contact resistance at a point of contact between the upper and lower layers, including the substeps of:
      (a-1) measuring a first voltage across the upper layer, measuring a second voltage across the lower layer;
      (a-2) measuring a third voltage across a first portion of the upper layer and a first portion of the lower layer wherein the first portions are joined by the point of contact;
      (a-3) measuring a fourth voltage across a second portion of the upper layer and a second portion of the lower layer wherein the second portions are joined by the point of contact;
      (a-4) and determining the difference between the sum of the first and second voltages and the sum of the third and fourth voltages;
   (b) comparing the contact resistance to a range of valid contact resistances;
   (c) if the contact resistance is within the valid range, determining the location of the point; and
   (d) accepting the location.

34. The method as recited in claim 33, wherein the upper layer comprises first and second electrodes and the lower layer comprises third and fourth electrodes, and wherein substep (a-1) comprises the substeps of:
   (a-1-A) coupling a current source to the first electrode;
   (a-1-B) coupling a ground to the second electrode; and
   (a-1-C) sampling the voltage at the first electrode and storing it as the first voltage.

35. The method as recited in claim 33, wherein the upper layer comprises first and second electrodes and the lower layer comprises third and fourth electrodes, and wherein substep (a-2) comprises the substeps of:
   (a-2-A) coupling a current source to the third electrode;
   (a-2-B) coupling a ground to the fourth electrode; and
   (a-2-C) sampling the voltage at the third electrode and storing it as the second voltage.

36. The method as recited in claim 33, wherein the upper layer comprises first and second electrodes and the lower layer comprises third and fourth electrodes, and wherein substep (a-3) comprises the substeps of:
   (a-3-A) coupling a current source to the first electrode;
   (a-3-B) coupling a ground to the fourth electrode; and
   (a-3-C) sampling the voltage at the first electrode and storing it as the third voltage.

37. The method as recited in claim 33, wherein the upper layer comprises first and second electrodes and the lower layer comprises third and fourth electrodes, and wherein substep (a-4) comprises the substeps of:
   (a-4-A) coupling a current source to the third electrode;
   (a-4-B) coupling a ground to the second electrode; and
   (a-4-C) sampling the voltage at the third electrode and storing it as the fourth voltage.

38. The method as recited in claim 34, wherein substep (a-1-A) comprises the substep of closing a switch between the current source and the first electrode.

39. The method as recited in claim 35, wherein substep (a-2-A) comprises the substep of closing a switch between the current source and the third electrode.

40. The method as recited in claim 34, wherein substep (a-1-B) comprises the substep of closing a switch between the ground and the second electrode.

41. The method as recited in claim 35, wherein substep (a-2-B) comprises the substep of closing a switch between the ground and the fourth electrode.

42. The method as recited in claim 33, wherein step c comprises the substeps of:
   (c-1) coupling a voltage source to a first electrode on the upper layer;
   (c-2) coupling a ground to a second electrode on the upper layer;
   (c-3) sampling the voltage on a third electrode on the lower layer and accepting it as a first position coordinate;
   (c-4) coupling the voltage source to the third electrode;
   (c-5) coupling the ground to a fourth electrode on the lower layer; and
   (c-6) sampling the voltage on the first electrode and accepting it as a second position coordinate.

43. The method as recited in claim 42, wherein substep c-1 comprises the substep of:
   (c-1-A) closing a first switch between the voltage source and the first electrode.

44. The method as recited in claim 43, wherein substep c-2 comprises the substep of:
   (c-2-A) closing a second switch between the ground and the second electrode.

45. The method as recited in claim 44, wherein substep c-4 comprises the substeps of:
   (c-4-A) opening the first switch; and
   (c-4-B) closing a third switch between the voltage source and the third electrode.

46. The method as recited in claim 45, wherein the substep c-5 comprises the substeps of:
   (c-5-A) opening the second switch; and
   (c-5-B) closing a fourth switch between the ground and the fourth electrode.

47. The method as recited in claim 36, wherein substep (a-3-A) comprises the substep of closing a switch between the current source and the first electrode.

48. The method as recited in claim 37, wherein substep (a-4-A) comprises the substep of closing a switch between the current source and the third electrode.

49. The method as recited in claim 37, wherein substep (a-4-B) comprises the substep of closing a switch between the ground and the second electrode.

50. The method as recited in claim 36, wherein substep (a-3-B) comprises the substep of closing a switch between the ground and the fourth electrode.

* * * * *